R. E. FRISON.
STARTING DEVICE FOR EXPLOSION ENGINES.
APPLICATION FILED JAN. 29, 1917.
1,240,332.
Patented Sept. 18, 1917.
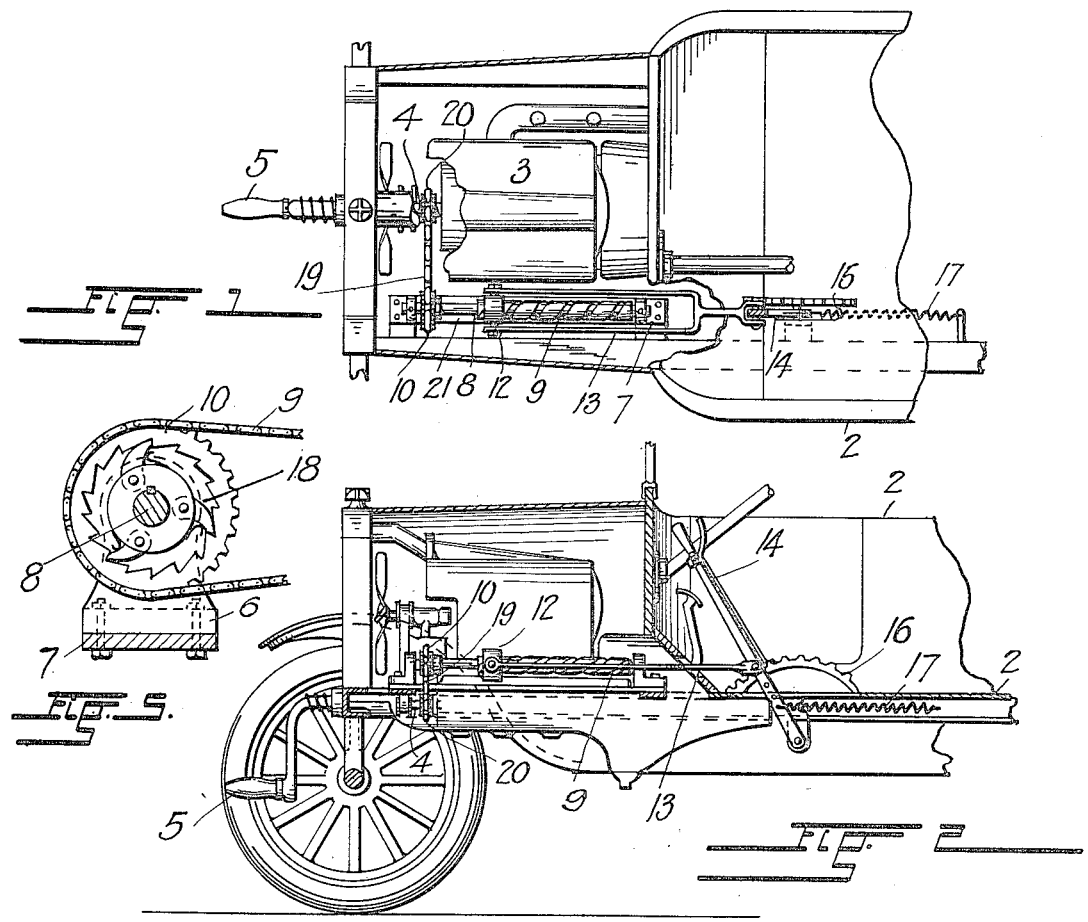
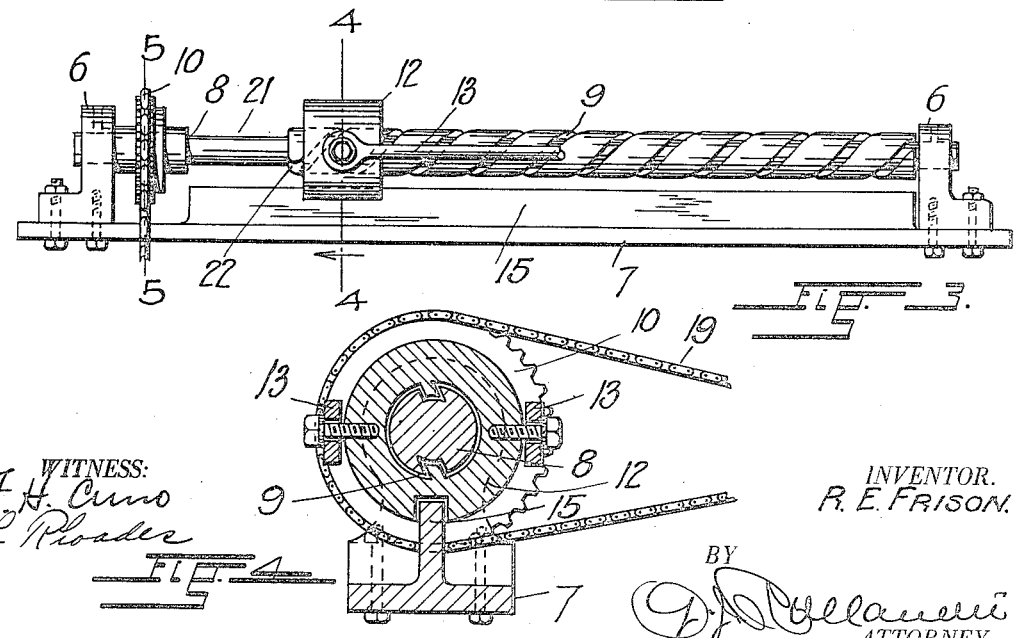
WITNESS:
F. H. Cuno
L. Rhoades
INVENTOR.
R. E. FRISON.
BY
ATTORNEY.

UNITED STATES PATENT OFFICE.

ROBERT E. FRISON, OF TEN SLEEP, WYOMING.

STARTING DEVICE FOR EXPLOSION-ENGINES.

1,240,332.

Specification of Letters Patent.   Patented Sept. 18, 1917.

Application filed January 29, 1917.   Serial No. 145,198.

*To all whom it may concern:*

Be it known that I, ROBERT E. FRISON, a citizen of the United States, residing at Ten Sleep, in the county of Washakie and State of Wyoming, have invented certain new and useful Improvements in Starting Devices for Explosion-Engines, of which the following is a specification.

This invention relates to starting devices for motor driven vehicles and its primary object resides in providing a mechanism of very simple construction which may be readily applied to motor-vehicles already in use and which operates to start the motor of the vehicle by movement of a lever adjacent the driver's seat.

An embodiment of my invention is illustrated in the accompanying drawings in the various views of which like parts are similarly designated and in which, Figure 1 is a plan view of the front end of a motor vehicle to which my improved starting mechanism has been applied, Fig. 2, a sectional elevation of the parts shown in Fig. 1, Fig. 3, an enlarged side elevation of the starting mechanism, Fig. 4, an enlarged transverse section along the line 4—4, Fig. 3, and Fig. 5, an enlarged transverse section taken along the line 5—5, Fig. 3.

Referring more specifically to the drawings, the reference numeral 2 designates the chassis of a power driven vehicle, 3 the engine mounted at the front end thereof, and 4 the cranking shaft which ordinarily is employed to start the motor by rotation of a crank 5.

My starting mechanism comprises a pair of bearings 6 which are mounted on a base plate 7 to be rigidly secured upon a suitable supporting surface of the vehicle chassis.

The bearings are axially alined to support for rotation a shaft 8 provided with a screw-thread 9 and carrying adjacent one of its ends a sprocket wheel 10. A nut 12 mounted for rectilinear movement along the shaft in coöperative relation to its screw threaded portion is by means of a forked rod 13 connected with an operating lever 14 fulcrumed adjacent the driver's seat of the vehicle.

The nut is held against rotation with the shaft by a guide rib 15 formed integrally with the base plate 7 and loosely fitted in a groove in its periphery.

The lever 14 is as usual provided with an adjustable detent which coöperates with a toothed segment 16 to secure it in its adjusted positions, and a spring 17 connecting the lever with a relatively stationary part of the chassis, serves to facilitate the movement of the nut along the shaft as will hereinafter be more fully described.

The sprocket wheel 10 is mounted on the shaft 8 for conjunctive rotation in one direction only, by means of a pawl and ratchet appliance 18 shown in Fig. 5 of the drawings, and it is through the medium of a chain 19 operatively connected with a similar sprocket wheel 20 rigidly mounted upon the starting shaft of the engine.

A space 21 between the end of the enlarged screw-threaded portion of the shaft and the sprocket wheel 10, is sufficiently wide to receive the nut in case of its retrograde motion by back-firing of the engine.

When the parts of my improved starting mechanism are in their normal position of rest, the nut 12 is at the forward end of the screw thread, as shown in the drawings, the lever 14 is locked in a corresponding position on the segment 16 and the spring 17 is tensioned by expansion.

When it is desired to start the motor with which the starting mechanism is associated, the operator occupying the driver's seat of the vehicle, releases the lever and moves it rearwardly about its fulcrum for the purpose of impelling the nut along the shaft.

Inasmuch as the nut is held against rotation by the guiding rib 15 on the base plate, the screw-threaded shaft is compelled to rotate in its bearings, and this rotary movement is by means of the sprocket wheels and chain, transmitted to the starting shaft of the engine.

After the motor has been started, the sprocket wheel 10 runs idly upon the shaft until the rotative continuity of the motor and starting shaft is broken, and in case the motor back-fires, the nut will be moved to an idle position in the space 21 between the end of the screw thread and the sprocket wheel 10.

The normally tensioned spring 17 greatly aids the movement of the nut along the shaft and by widening the end of the screw thread as at 22 in Fig. 3, the replacement of the nut in coöperative relation to the thread, is facilitated.

The spring 17 not only aids in moving the nut along the shaft but also holds the moving parts in frictional contact whereby to eliminate rattling and prevent accidental displacement.

Having thus described the construction and operation of my improved starting mechanism in the best form at present known to me, I desire it understood that changes in the form and arrangement of its parts may be resorted to within the spirit of my invention.

I claim:

1. A starting device for explosion-engines comprising a rotary screw-threaded shaft, a non-rotating nut coöperating with said screw-thread, means for transmitting the rotary motion of the shaft, a spring for impelling the nut along the shaft, and means for locking said spring in a tensioned condition.

2. A starting device for explosion-engines comprising a rotary screw-threaded shaft, a non-rotating nut coöperating with said screw-thread, means for transmitting the rotary motion of the shaft, a lever for impelling the nut along the shaft, and a spring in impellent relation to said lever.

3. A starting device for explosion engines comprising a rotary screw threaded shaft, a non-rotating nut coöperating with said screw-thread, means for transmitting the rotary motion of the shaft, a lever for impelling the nut along the shaft, means for locking said lever in an adjusted position, and a spring in impellent relation to said lever.

4. A starting device for explosion-engines comprising a rotary screw threaded shaft, a non-rotating nut coöperating with said screw-thread, means for impelling the nut along the shaft, and means for transmitting the rotary motion of the shaft, the shaft having at an end of its screw-thread, a non-threaded portion to receive the nut when impelled by back-firing of an engine with which the shaft has a driving connection.

In testimony whereof I have affixed my signature in presence of two witnesses.

ROBERT E. FRISON.

Witnesses:
FRANK J. WOOD,
G. F. A. CONNER.